Dec. 6, 1960
R. L. JEPSEN ET AL
2,963,605
ION DRAINING STRUCTURES
Filed Nov. 4, 1954
5 Sheets-Sheet 5
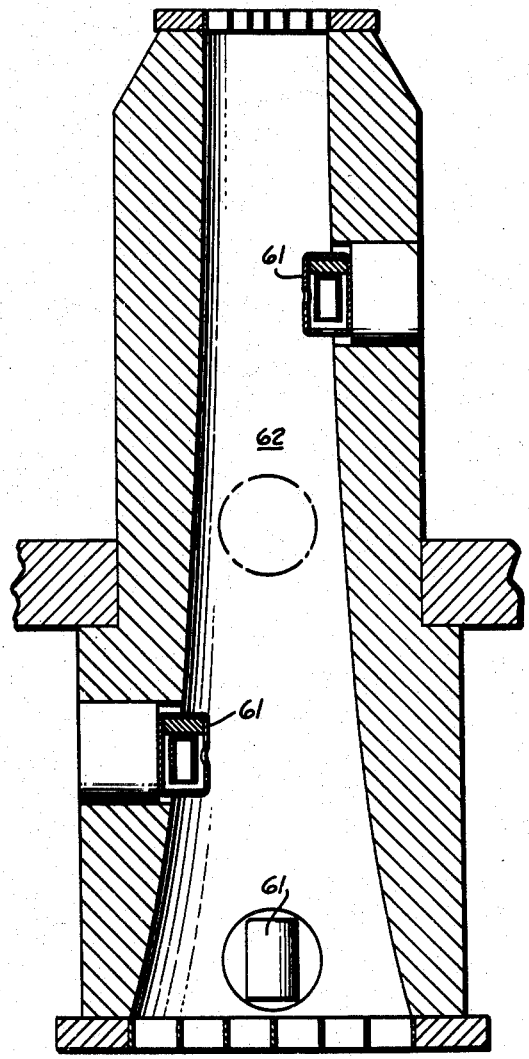
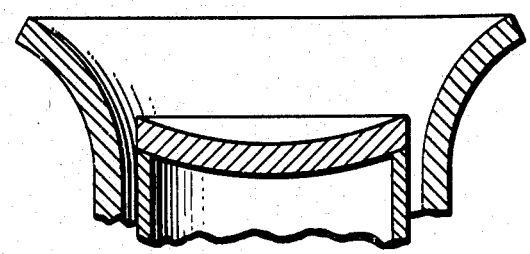
FIG_11
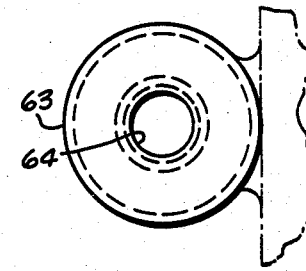
FIG_12
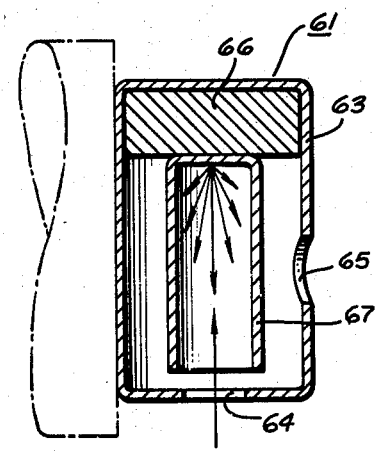
FIG_13
Robert L. Jepsen &
Peter H. Kafitz
INVENTORS
BY Paul B. Hunter
ATTORNEY United States Patent Office 2,963,605
Patented Dec. 6, 1960

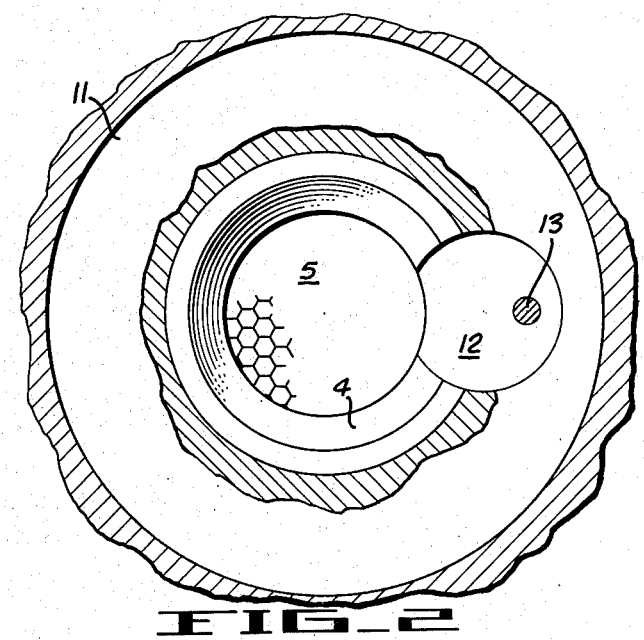
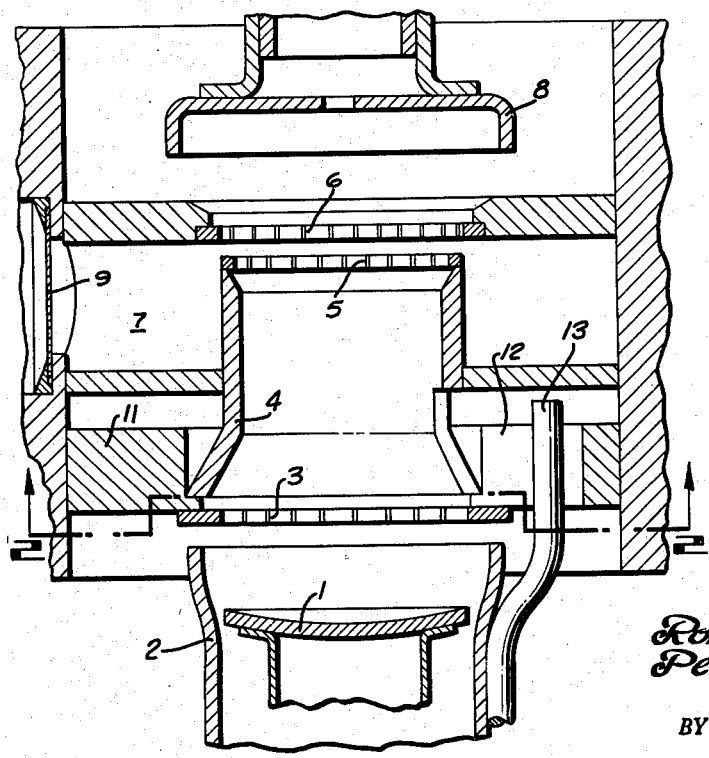
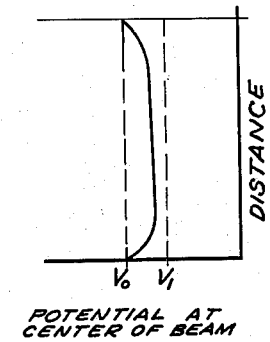

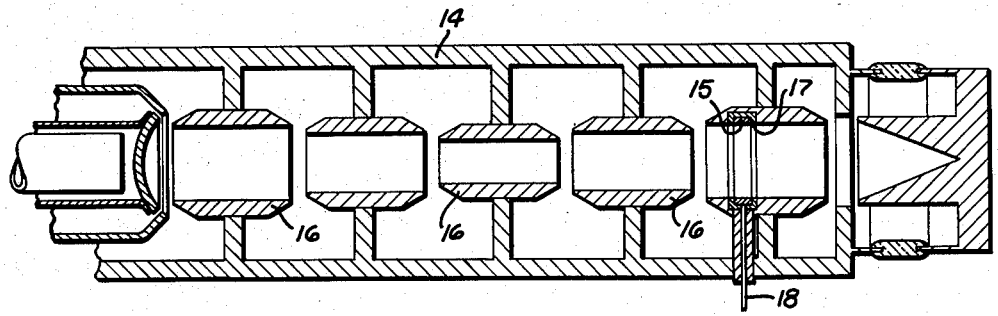
FIG_4
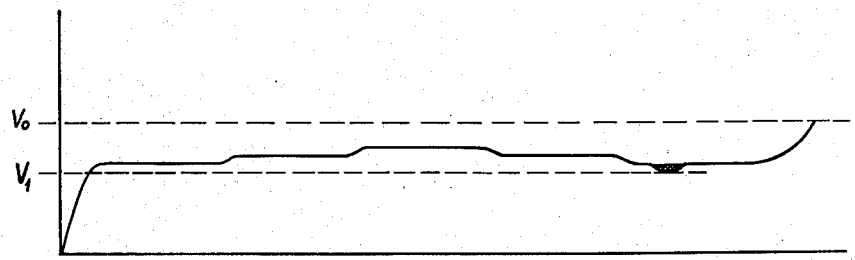
FIG_5
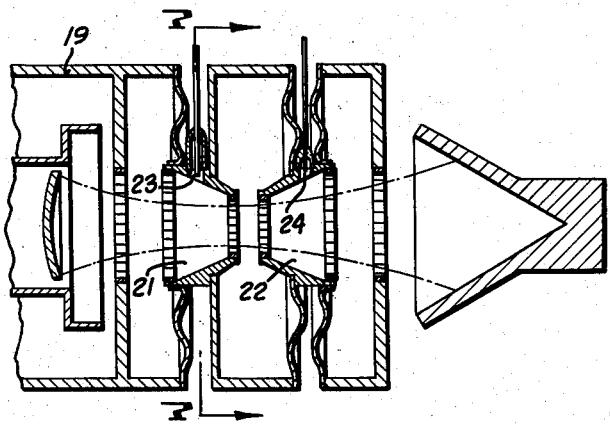
FIG_6
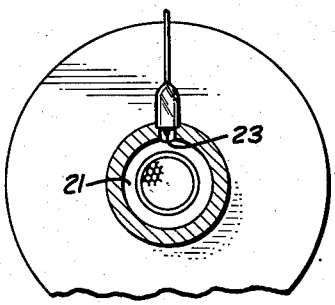
FIG_7
Robert L. Jepsen &
Peter H. Kafitz
INVENTORS
BY
ATTORNEY

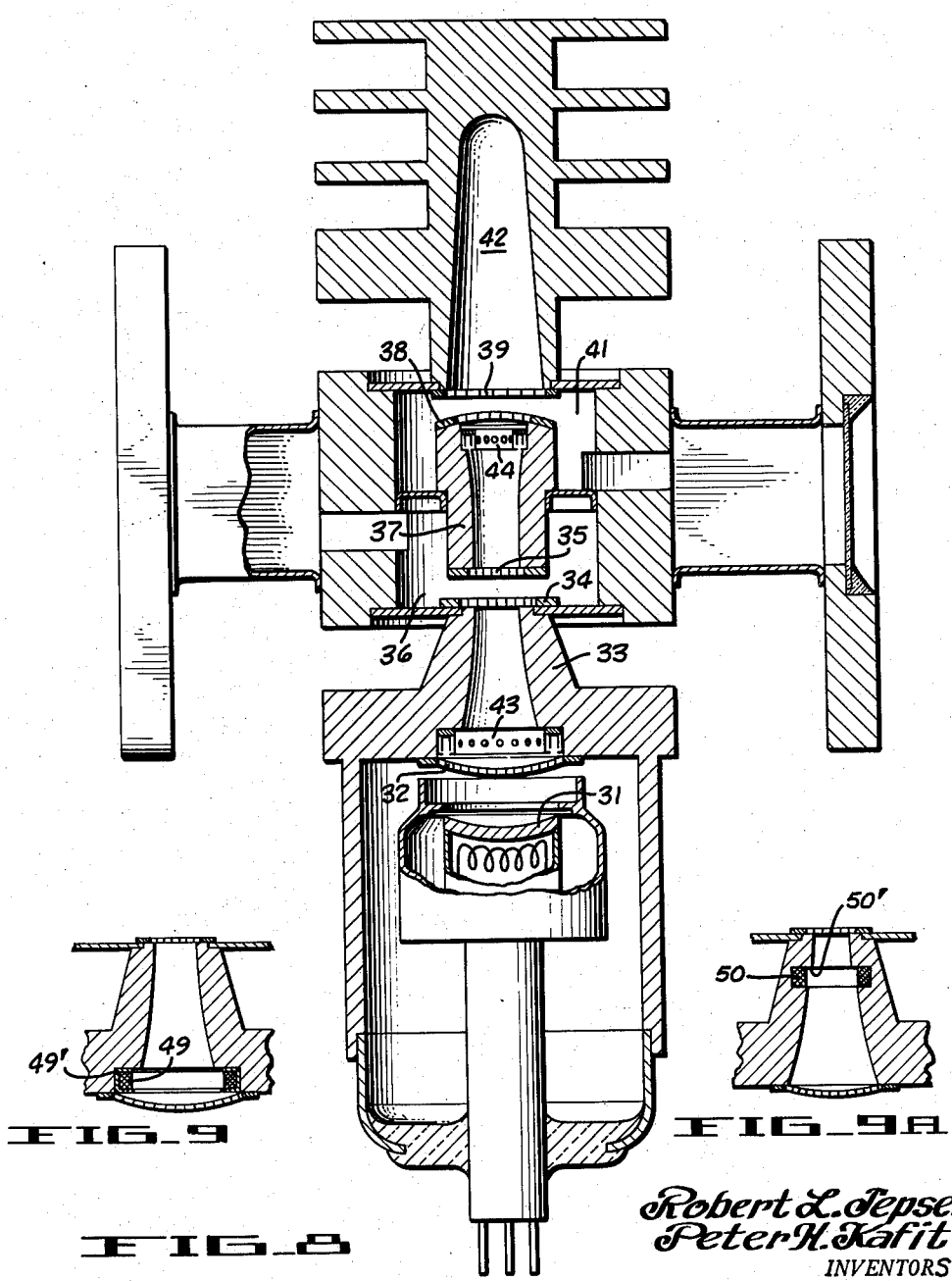

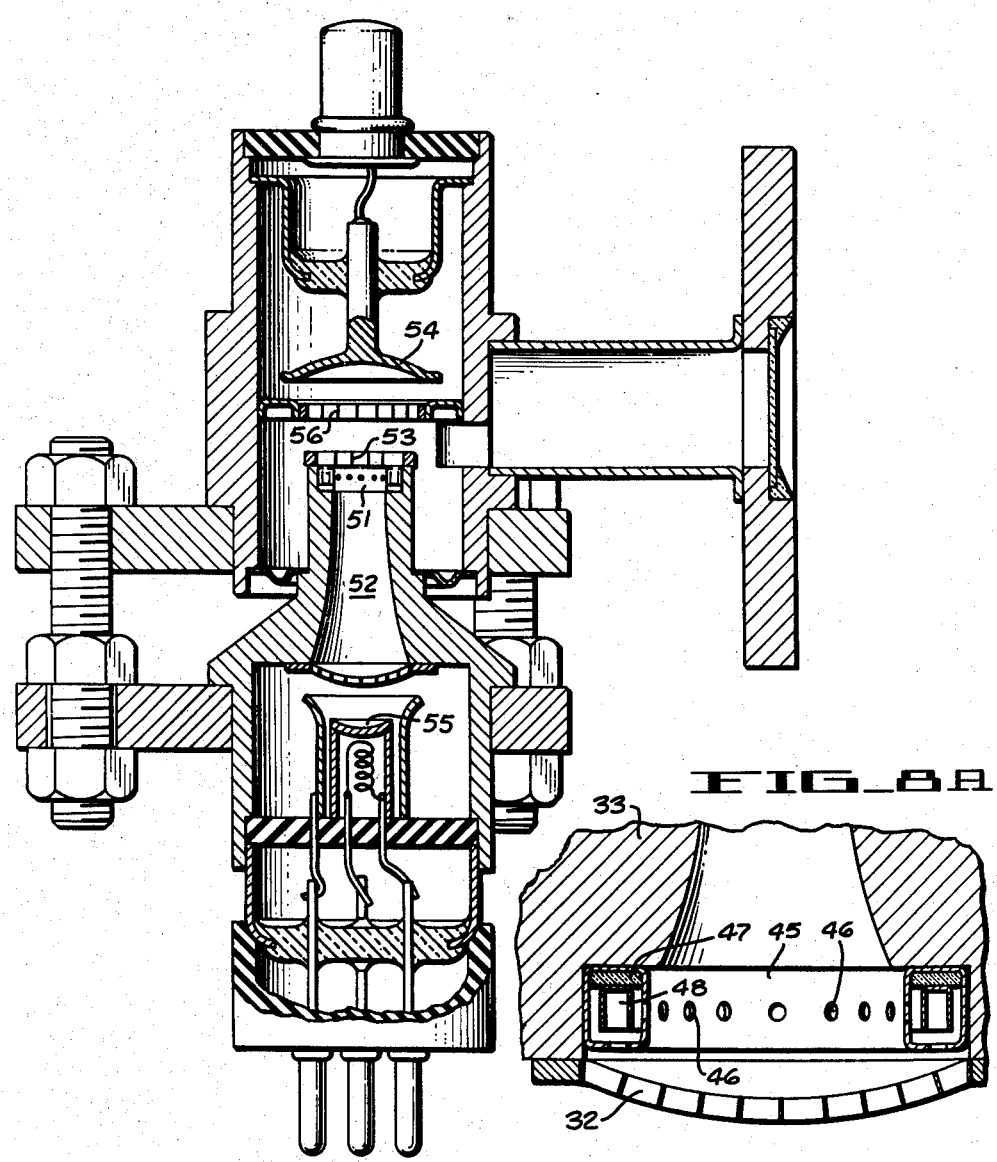

2,963,605
ION DRAINING STRUCTURES

Robert L. Jepsen, Los Altos, and Peter H. Kafitz, Mountain View, Calif., assignors to Varian Associates, San Carlos, Calif., a corporation of California Filed Nov. 4, 1954, Ser. No. 466,842

7 Claims. (Cl. 313—68)

This invention relates in general to ultrahigh frequency electron tube devices and, more particularly, to the utilization of novel structures and apparatus in such devices whereby ions may be removed from the electron beam paths.

In a co-pending application entitled "Electron Discharge Apparatus" bearing Serial No. 384,018, filed by Robert L. Jepsen and Curtis E. Ward on October 5, 1953, now Patent No. 2,888,599, there is described novel apparatus and methods for draining ions from ion traps. There is also set forth therein a brief discussion of the difficulties encountered in electron discharge devices such as, for example, klystrons and traveling wave tubes heretofore employed which arise from the interaction between the electron beam and the ions trapped along the path of the beam. These difficulties may include:

(1) Modulation of output power, frequency, and beam current at the frequency or frequencies of continuous ion oscillation. These frequencies are, typically, in the range .1 megacycle per second to 10 megacycles per second.

(2) Modulation of output power, frequency and beam current at both a. Ion oscillation frequencies (in the megacycles per second range) and b. Low frequencies (typically in the audio frequency range). The low frequency fluctuations are associated with the high frequency ion oscillations.

(3) Changes in output power, frequency, and beam current as the frequency of an applied modulating voltage is varied. These changes occur when the modulating frequency is near one of the frequencies of incipient ion oscillation and they may be abrupt or fluctuating.

This present invention has for its object the utilization of improved apparatus and methods for removing ions from the beam paths of electron discharge devices.

One feature of the present invention is the provision of an ion draining electrode which bears a negative potential relative to the ion trap structure and which extends its field into the ion trap whereby ions may be attracted to and gathered on the electrode.

A further feature of the present invention is the provision of novel methods and apparatus whereby a portion of the electrons in the beam may be collected on an insulated electrode, with the provision that said insulated electrode have an effective secondary emission ratio less than unity, thus causing the insulated electrode to acquire a potential which is negative with respect to the beam, the electrode being positioned within or adjacent to the ion trap such that ions will be attracted to and gathered on the electrode.

Another feature of the present invention is the provision of an insulated electrode so positioned that it collects secondary electrons emitted from some other electrode or structure within the discharge device, the first electrode thus having a negative potential developed thereon and being so positioned to attract ions from the undesirable ion trap.

These and other features and advantages of the present invention will be better understood from perusal of the following description taken in connection with the accompanying drawings wherein Fig. 1 is a longitudinal section view of a portion of a reflex klystron which embodies an ion collecting electrode therein for draining ions from the drift space, Fig. 2 is a section view of the reflex klystron of Fig. 1 taken along section lines 2—2 in Fig. 1, Fig. 3 is a plot of the potential at the center of the beam vs. the distance along the ion trapping drift space for the klystron in Fig. 1, Fig. 4 is a longitudinal section view of a multicavity klystron in which an ion collecting electrode is positioned within the drift tube near the collector end for collecting ions from the trap near this collector end, Fig. 5 is a plot of the potential at the center of the beam vs. distance along the beam path for the klystron in Fig. 4, Fig. 6 is a longitudinal section view of a multicavity klystron in which ion collecting electrodes are associated with each of the ion trapping drift tubes, Fig. 7 is a section view taken along lines 7—7 in Fig. 6, Fig. 8 is a longitudinal section view of a two-cavity klystron in which novel ion collecting electrodes are positioned within each of the two ion trapping drift spaces, Fig. 8A is a section view of one of the electrodes and associated structure of Fig. 8, Fig. 9 is a view of another form of ion draining electrode made in accordance with the invention, Fig. 9A is a view of still another ion draining electrode, Fig. 10 shows in longitudinal section a reflex klystron which includes an ion collecting electrode within the ion trapping drift space, the electrode charging up negatively due to the collection thereon of beam electrons which have returned from the reflector region and have passed through the R-F gap, Fig. 11 is a longitudinal section view of a portion of a velocity modulation tube of the klystron type in which individual ion collecting electrodes are advantageously distributed, Fig. 12 is a plan view of one of the electrodes shown in Fig. 11, and Fig. 13 is an enlarged section view of one of the electrodes shown in Fig. 11.

Referring now to Figs. 1 and 2, there is shown a reflex klystron embodying the present invention, there being shown only such parts of a reflex klystron as are necessary to illustrate the present invention. It should be understood that the beam path of this particular klystron would also be enclosed in a vacuum envelope or body and the klystron would include other elements not shown. The reflex klystron comprises a cathode button 1, focusing electrode 2, accelerator grid 3, drift tube 4, first and second resonator grids 5 and 6 included in the resonator 7, reflector electrode 8, and output window 9. The drift tube 4 and accelerator grid 3 are mounted on an annular header 11. A circular opening 12 extends through the annular header and one side of the drift tube 4 thus producing a small recess or cavity coupled to the drift tube space. Fixedly secured on the focusing electrode 2 is a filamentary electrode 13 which extends into the opening 12.

In operation, a stream of electrons is emitted from the cathode 1 and is focused into a beam by the negative charge on the focusing electrode 2, the beam of electrons being accelerated toward the resonator grids 5 and 6 by the positive potential of the grid 3 with respect to the cathode. The electrons in this beam pass through the drift tube space and then through the cavity resonator gap between grids 5 and 6 where they are velocity modulated by the radio frequency voltages across the gap in a well known manner. The electrons are repelled by the reflector 8 and turned about to again pass through the resonator gap in bunches to give up energy in the field of the cavity resonator.

The electrons, in passing through the drift tube 4, collide with gas molecules therein and produce positive ions in the drift space, these ions being normally trapped in this space between the grids 3 and 5 resulting in the above mentioned deleterious effects. However, the negative charge existing on the electrode 13 produces an ion attracting field which extends into the drift tube space and attracts the positive ions therein. These ions pass out from the drift tube space into the chamber 12 where they are gathered on the electrode 13. The type of voltage sink or depression in the drift tube space between the grids 3 and 5 which produces the ion trapping effect is illustrated in the voltage plot shown in Fig. 3. In the novel klystron of Fig. 1 this sink is still present but the ions are nevertheless drained out from this customary ion trap by the electrode 13.

Referring now to Fig. 4, there is shown a multicavity high powered klystron tube 14 in which the drift space between the series of cavity resonators tapers to a minimum inner-diameter at the central point. Fig. 5 is a plot of the potential at the center of the beam vs. the distance along the beam path of this klystron and from this plot it is evident that the ions will be drained in a downhill manner from the central position of the tube down toward the negatively charged cathode end. The negative charge on the cathode renders this cathode a very effective ion collecting member and the ions formed in this half of the tube are effectively drained. Although the presence of positive ions in this first half of the klystron produce the most serious disturbances, it is also desirable in some cases to also prevent the accumulation of ions in the latter half for collector end of the tube. It can be seen from the potential plot that the positive ions will also drain downhill toward the collector end but will collect near this end in a trap since the collector carries a positive charge and therefore repels these positive ions rather than collect them. An annular electrode 15 is embedded in the inner surface of the last first drift tube 16 and is insulated therefrom by a layer of insulating material 17 positioned between the electrode 15 and the drift tube wall 16. An insulated lead 18 from the electrode 15 extends out from the klystron to which may be connected the source of negative potential for collecting the ions from the drift spaces in this end of the tube.

Referring now to Figs. 6 and 7, there is shown another embodiment of the present invention wherein a multicavity resonator tube 19 is shown in which two drift tube spaces 21 and 22 are present. Insulated electrodes 23 and 24 extend adjacent to each drift tube space, these electrodes being so adapted that a negative potential applied thereto will result in a draining of the ions from the drift spaces 21 and 22. One advantage of using a rod-like electrode rather than an annular electrode as above is the relative simplicity of incorporating the electrode in the electron discharge device. An advantage of the annular electrode is that the action of the electrode will be axially symmetric.

It is often inconvenient to insert an insulated electrode into a drift tube and supply it with a separate source of potential. Shown in Fig. 8 is a reflex klystron in which a novel ion draining method and apparatus is utilized which does not require the use of any external voltage source. The particular embodiment shown is a two-cavity klystron amplifier including the cathode 31, accelerator grid 32, first drift tube 33, resonator grids 34 and 35 of the buncher cavity resonator 36, second drift tube 37, resonator grids 38 and 39 of the catcher resonator 41, and collector 42. Secured in the first drift tube space adjacent to the accelerator grid 32 is an ion collecting electrode assembly 43, and positioned in the second drift tube space adjacent the resonator grid 38 is a second ion collecting electrode assembly 44. These two ion collecting electrode assemblies are similar in construction and only one will be described (see Fig. 8A). The electrode assembly 43 comprises a hollow annular shielding member 45 having a substantially U-shaped cross-section, the member 45 being so positioned that its channel opening faces the grid 32. Located around the inside wall of the member 45 are a plurality of openings 46. An insulating material 47 extends around the inner surface of the upper wall of the member 45. Fixedly secured on the insulating material 47 is an annular ion collecting electrode 48 of a conductor material such as copper which extends around the inside of the member 45 and which is substantially U-shaped in cross-section. The open side of this electrode also faces the grid 32.

In operation, a small fraction of the electrons in the fringe of the beam of electrons emitted from the cathode 31 enters the channel member 45 and also the electrode 48 where they impinge and collect upon the inner U-shaped surface. The collection of these electrons on electrode 48 produces a negative potential on this electrode. But these electrons, on striking the electrode cause secondary electrons to be emitted from this electrode and, if too many of these secondary electrons are permitted to escape, the electrode will not be charged negatively. With many materials, the number of secondary electrons emitted is greater than the number of primary electrons collecting on the electrode and the secondary emission ratio is greater than unity. When this occurs the material will attain a positive charge until such time as the ratio reaches unity. It is therefore desirable, in order for the electrode to attain a negative potential, to prevent the secondary electrons from escaping and it is for this reason that we show the electrode 48 having the particular enclosed configuration. Thus the electrode 48 assumes a negative potential with respect to the drift tube space and the positive ions formed in the drift tube space are attracted to the negatively charged electrode 48 through the openings 46 in the wall of casing 45. A similar effect is produced by the ion collecting electrode assembly 44 in the other drift tube space. This electrode 48 may be of either conductor material such as copper or insulator material such as ceramic or glass. If the electrode is an insulator material it does not need to be further insulated from the tube elements.

This particular channel-shaped configuration electrode is shown as one method for trapping the secondary electrons, that is for maintaining the secondary emission ratio at less than unity. Other various configurations of this could be utilized, the important characteristic being that the effective secondary emission ratio is always less than unity.

Since the ion draining electrode 48 is charged to a different potential than the drift tube, the potential variation may produce an undesirable influence on the beam of electrons. For this reason, the electrode is shown shielded from the beam by the inner wall of member 43, the small holes 46 in the wall being sufficient to drain the ions. If the influence on the beam of the potential on the electrode is not serious, the holes may be greatly enlarged or the channel member 45 itself may be omitted.

Figs. 9 and 9A show ion trapping drift tube spaces in which ion draining electrodes are utilized in accordance with the present invention. In Fig. 9, the ion draining electrode 49 is a conductor material such as copper in the form of an annular ring, the ring being insulated from the drift tube by a layer of glass or ceramic or other insulating material 49'. Secondary electrons emitted from the resonator grid and other nearby surfaces collect on the ion draining electrode and produce the ion attracting charge on the electrode. The ion draining electrode 50 of Fig. 9A is made of an insulator material such as glass or ceramic. The drift tube wall has a slight protruding ledge 50' above the electrode which intercepts the fringe electrons of the beam and emits secondary electrons. These electrons collect on the electrode and produce the ion collecting charge.

There is shown in Fig. 10 still another embodiment of the present invention wherein an ion collecting electrode assembly 51 is positioned in the drift tube space 52 of a reflex klystron adjacent the first resonator grid 53. The ion draining electrode assembly is similar in construction to those described in Fig. 8 but in the present instance the opening in the electrode assembly 51 faces the reflector electrode 54 rather than the cathode 55. In this instance the ion collecting electrode is charged negatively by the returning electrons repelled by the reflector 54. The ion draining electrode is designed to trap its own secondaries to a degree such that the effective secondary emission ratio is less than unity. It may also collect some other secondary electrons emitted from other nearby tube elements. The negative potential produced on this electrode causes the ions in the drift tube space to be drawn through the openings in the inner wall or casing.

Referring now to Figs. 11, 12, and 13, there is shown a partial view of a klystron having an elongated drift tube space wherein a plurality of ion collecting electrode assemblies 61 are positioned, these individual ion draining electrode assemblies being effectively placed around the drift tube space. Each electrode assembly comprises a hollow cylindrical shielding casing 63 with an opening 64 therein facing the beam source and a second opening 65 in the side wall thereof. An insulator 66 is secured to the upper wall of the casing, a hollow cylindrical electrode 67 being secured thereon with its one open end aligned with the opening 64 in the casing. The beam electrons enter the casing through the opening 64 and are collected by the electrode 67 to produce the negative charge thereon. Secondary electrons produced when the beam electrons strike the electrode 67 are trapped in the electrode 67 by virtue of its geometry. The ions in the drift tube space are drained through the hole 65 in the side wall of the casing 63 and collect on the electrode 67.

As noted above, the ion collecting electrodes utilized in the ion trap region which develop a negative charge by collecting beam electrons or secondary electrons may be of insulator material such as glass or ceramic or insulated conductor material such as cooper and where an electrode of one type is shown it is understood that the other type may be substituted.

Since many changes could be made in the particular structures shown and many different embodiments of this invention could be made without departing from the scope thereof, it is intended that all matter contained in the above description or shown in the accompanying drawings shall be taken as illustrative and not in a limiting sense.

What is claimed is:

1. An electron discharge device adapted to produce a beam of electrons therein, a member forming a passageway in said device for said electron beam, and an ion collecting electrode positioned in said passageway for attracting and removing positive ions formed in said passageway, said electrode being insulated from said member and having a cavity opening therein facing the direction of the electron beam flow whereby electrons from said beam may enter the opening in said electrode and collect thereon, the secondary electrons emitted from said electrode upon collision by the primary beam electrons being trapped within the cavity opening and thus collecting on said electrode, the collected primary electrons and the retained secondary electrons producing a resultant negative charge on the electrode, said negatively charged electrode attracting positive ions formed within the passageway.

2. An electron discharge device as claimed in claim 1 including a metallic wall substantially surrounding said electrode for shielding the passageway from the negative potential on said electrode, said shielding member having an opening therein coupling the passageway to the electrode through which ions pass from the passageway to the electrode.

3. An electron discharge device as claimed in claim 2 wherein said electrode is made up of a substantially non-conducting or insulator material.

4. An electron discharge device as claimed in claim 2 wherein said electrode is made up of an electrically conducting material.

5. An electron discharge device as claimed in claim 1 wherein said ion collecting electrode comprises an annular member having a substantially U-shaped cross-section, the open side of said member facing the direction of the electron beam flow.

6. An electron discharge device as claimed in claim 5 including an annular shielding member having a substantially U-shaped cross-section, said ion collecting electrode positioned within said annular shielding member and insulated therefrom, said shielding member having openings in the surface thereof for permitting ions to pass through to said ion collecting electrode.

7. An electron discharge device having means therein adapted to produce a beam of electrons directed through a passageway in the device, an electrode positioned in said passageway so as to collect some of said beam electrons, said electrode being insulated from said device and having a surface area formed to prevent the secondary electrons produced by the primary electrons in said beam impinging on the electrode from escaping from the electrode, said electrode thus having a negative charge developed thereon due to the collection of the primary electrons and the retention of the secondary electrons for attracting positive ions formed within said passageway.

References Cited in the file of this patent

UNITED STATES PATENTS

| | | |
|---|---|---|
| 2,305,884 | Litton | Dec. 22, 1942 |
| 2,445,811 | Varian | July 27, 1948 |
| 2,455,269 | Pierce | Nov. 30, 1948 |
| 2,555,850 | Glyptis | June 5, 1951 |
| 2,568,325 | Diamond | Sept. 18, 1951 |
| 2,692,351 | Morton | Oct. 19, 1954 |
| 2,725,499 | Field | Nov. 29, 1955 |
| 2,758,245 | Varian | Aug. 7, 1956 |
| 2,825,842 | Kenyon | Mar. 4, 1958 |